(12) United States Patent
Xu et al.

(10) Patent No.: US 12,550,163 B2
(45) Date of Patent: Feb. 10, 2026

(54) NR SIDELINK TRANSMISSION GAP

(71) Applicant: QUALCOMM Incorporated, San Diego, CA (US)

(72) Inventors: Huilin Xu, Temecula, CA (US); Peng Cheng, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 615 days.

(21) Appl. No.: 18/005,024

(22) PCT Filed: Oct. 1, 2020

(86) PCT No.: PCT/CN2020/119767
§ 371 (c)(1),
(2) Date: Jan. 10, 2023

(87) PCT Pub. No.: WO2022/067834
PCT Pub. Date: Apr. 7, 2022

(65) Prior Publication Data
US 2023/0328759 A1    Oct. 12, 2023

(51) Int. Cl.
*H04W 72/25* (2023.01)
*H04W 76/27* (2018.01)
*H04W 92/18* (2009.01)

(52) U.S. Cl.
CPC .......... *H04W 72/25* (2023.01); *H04W 76/27* (2018.02); *H04W 92/18* (2013.01)

(58) Field of Classification Search
CPC ..... H04W 72/25; H04W 72/20; H04W 76/27; H04W 76/10; H04W 76/14; H04W 76/23; H04W 52/02; H04W 92/18
See application file for complete search history.

(56) References Cited

U.S. PATENT DOCUMENTS

2018/0049143 A1    2/2018   Gupta et al.
2018/0167820 A1    6/2018   Belleschi et al.
(Continued)

FOREIGN PATENT DOCUMENTS

CN   110073692 A       7/2019
WO   WO-2017048095 A1  3/2017
WO   WO-2018031269     2/2018

OTHER PUBLICATIONS

Ericsson: "On D2D Gaps," 3GPP TSG-RAN WG2 #90, Tdoc R2-153595, Beijing, P.R. China, Aug. 24-28, 2015, (Aug. 28, 2015), the whole document, pp. 1-5.
(Continued)

*Primary Examiner* — Brian T Le
(74) *Attorney, Agent, or Firm* — Norton Rose Fulbright US LLP

(57) ABSTRACT

Techniques described provide for a wireless network to establish and implement periodic and aperiodic sidelink gaps. One implementation may include transmitting, by a first user equipment (UE), a sidelink configuration message. The sidelink configuration message may indicate a capability of the first UE to support a sidelink periodic gap and a sidelink aperiodic gap. A message may be received by the first UE indicating whether the first UE is allowed to request a gap according to one or more of the indicated capabilities. The first UE may transmit a sidelink information message comprising an absolute radio frequency channel number (AR-FCN) and an associated gap list. An RRC reconfiguration message may also be received by the first UE having and updated gap list. Other aspects and features are also claimed and described.

35 Claims, 9 Drawing Sheets

(56) References Cited

U.S. PATENT DOCUMENTS

2018/0263019 A1* 9/2018 Jung ............... H04W 72/0453
2018/0317278 A1 11/2018 Fujishiro et al.
2020/0229251 A1 7/2020 Vutukuri et al.

OTHER PUBLICATIONS

International Search Report and Written Opinion—PCT/CN2020/119767—ISA/EPO—Jul. 1, 2021.
LG Electronics Inc: "Sidelink Gap for Discovery," 3GPP TSG-RAN WG2 #91, R2-153831, Beijing, China, Aug. 24-28, 2015, (Aug. 28, 2015), the whole document, pp. 1-4.
VIVO: "Remaining Issues on Physical layer Procedure for NR Sidelink", 3GPP TSG RAN WG1 #102-e, R1-2005344, e-Meeting, Aug. 17-28, 2020, 7 pages.

* cited by examiner

PERIODIC GAP

APERIODIC GAP

NR SIDELINK TRANSMISSION GAP

TECHNICAL FIELD

Aspects of the present disclosure relate generally to wireless communication systems, and more particularly, to sidelink gaps used for discovery in device to device communications. Certain embodiments of the technology discussed below can configure and utilize periodic and aperiodic sidelink gaps.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

Wireless communication networks may also enable multiple UEs to directly connect in a device-to-device (D2D), or sidelink, configuration. When implementing such a configuration, devices in the network may function to establish a sidelink gap where a UE does not need to monitor a downlink signal from a base station. Such gaps may improve discovery performance within the network and provide other benefits for improving network traffic.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is provided. A method may include transmitting, by a first user equipment (UE), a sidelink configuration message, said sidelink configuration message indicating a capability of the first UE to support a sidelink periodic gap, a sidelink aperiodic gap, or a combination thereof. The first UE may further receive a message indicating whether the first UE is allowed to request a gap according to one or more of the indicated capabilities. A method may also include transmitting, by the first UE, a sidelink information message comprising an absolute radio frequency channel number (ARFCN) and an associated gap list. The first UE may further receive an RRC reconfiguration message that includes a gap list which is an update of the associated gap list.

In an additional aspect of the disclosure, an apparatus configured for wireless communication may include a means for transmitting, by the a first UE, a sidelink configuration message, said sidelink configuration message indicating a capability of the first UE to support a sidelink periodic gap, a sidelink aperiodic gap, or a combination thereof. An apparatus may further include a means for receiving a message indicating whether the first UE is allowed to request a gap according to one or more of the indicated capabilities. An apparatus may also include a means for transmitting a sidelink information message comprising an absolute radio frequency channel number (ARFCN) and an associated gap list. Further, an apparatus may include a means for receiving an RRC reconfiguration message that includes a gap list which is an update of the associated gap list.

In an additional aspect of the disclosure, a non-transitory computer-readable medium having program code recorded thereon. The program code further includes code to transmit, by a first user equipment (UE), a sidelink configuration message, said sidelink configuration message indicating a capability of the first UE to support a sidelink periodic gap, a sidelink aperiodic gap, or a combination thereof. Program code may also include code to receive, by the first UE, a message indicating whether the first UE is allowed to request a gap according to one or more of the indicated capabilities. Further, program code may include code to transmit, by the first UE, a sidelink information message comprising an absolute radio frequency channel number (ARFCN) and an associated gap list, and receive, by the first UE, an RRC reconfiguration message that includes a gap list which is an update of the associated updated gap list.

In an additional aspect of the disclosure, an apparatus configured for wireless communication is disclosed. The apparatus includes at least one processor, and a memory coupled to the processor. The processor is configured to transmit, by a first user equipment (UE), a sidelink configuration message, said sidelink configuration message indicating a capability of the first UE to support a sidelink periodic gap and a sidelink aperiodic gap. A processor may receive a message indicating whether the first UE is allowed to request a gap according to one or more of the indicated capabilities. A processor may also transmit a sidelink information message comprising an absolute radio frequency channel number (ARFCN) and an associated gap list. Further, a processor may receive an RRC reconfiguration message having and updated gap list.

In accordance with aspects of the disclosure, the foregoing systems, methods, and apparatuses may be implemented in combination with one or more additional features, such as the following features whether alone or in combination. For example, the above systems, methods, and apparatuses may be implemented where: the first UE is a relay UE and the messages transmitted and received by the first UE are between the first UE and a base station, where the first UE is a remote UE and the messages transmitted and received by the first UE are between the first UE and a relay UE, and/or where the first UE is a remote UE and the messages transmitted and received by the first UE are between the first UE and a base station. The above systems, methods, and apparatuses may be implemented where the sidelink configuration message indicates a capability of the first UE to support an aperiodic gap. When an aperiodic gap is utilized, the systems, methods and apparatuses may transmit, by the first UE, an MAC-CE message to indicate that an aperiodic gap from the associated gap list is needed and receive, by the first UE, an MAC-CE confirmation message indicating that the aperiodic gap from the associated cap list can be used. The above systems, methods, and apparatuses may be implemented where an aperiodic gap of the associated gap list includes a duration and associated bitmap. Additionally, in some aspects the message received indicating whether the first UE is allowed to request a gap according to the aperiodic gap capability indication may be an RRC reconfiguration message, and message received indicating whether the first UE is allowed to request a gap according to the periodic gap capability indication may be one of an RRC reconfiguration message and SIB12 message. The above systems, methods, and apparatuses may also be implemented where a sidelink configuration message indicating a capability of the first UE to support only a sidelink periodic gap may be an indication that the first UE does not currently support a sidelink aperiodic gap.

In one aspect of the disclosure, a method of wireless communication is provided. A method may include receiving a sidelink configuration message from a first UE, said sidelink configuration message indicating a capability of the first UE to support a sidelink periodic gap and a sidelink aperiodic gap. A method may also include, transmitting a message indicating whether the first UE is allowed to request at least one of a periodic and an aperiodic a gap according to one or more of the indicated capabilities. A method may include receiving a sidelink information message comprising an absolute radio frequency channel number (ARFCN) and an associated gap list. Additionally, a method may include determining at least one gap that the first UE is authorized to utilize based on the sidelink information message, and transmitting an RRC reconfiguration message having and updated gap list to the first UE.

In an additional aspect of the disclosure, an apparatus configured for wireless communication may include a means for means for receiving a sidelink configuration message from a first UE, said sidelink configuration message indicating a capability of the first UE to support a sidelink periodic gap and a sidelink aperiodic gap. An apparatus may further include a means for transmitting a message indicating whether the first UE is allowed to request at least one of a periodic and an aperiodic a gap according to one or more of the indicated capabilities. Additionally, an apparatus may include a means for receiving a sidelink information message comprising an absolute radio frequency channel number (ARFCN) and an associated gap list. Further, an apparatus may include a means for determining at least one gap that the first UE is authorized to utilize based on the sidelink information message, and a means for transmitting an RRC reconfiguration message having and updated gap list to the first UE.

In an additional aspect of the disclosure, a non-transitory computer-readable medium having program code recorded thereon. The program code further includes code to receive a sidelink configuration message from a first UE, said sidelink configuration message indicating a capability of the first UE to support a sidelink periodic gap and a sidelink aperiodic gap. Program code may include code to transmit a message indicating whether the first UE is allowed to request at least one of a periodic and an aperiodic a gap according to one or more of the indicated capabilities. Program code may also include code to receive a sidelink information message comprising an absolute radio frequency channel number (ARFCN) and an associated gap list. Program code may also include code to determine at least one gap that the first UE is authorized to utilize based on the sidelink information message and code to transmit an RRC reconfiguration message having and updated gap list to the first UE.

In an additional aspect of the disclosure, an apparatus configured for wireless communication is disclosed. The apparatus includes at least one processor, and a memory coupled to the processor. A processor is configured to receive a sidelink configuration message from a first UE, said sidelink configuration message indicating a capability of the first UE to support a sidelink periodic gap and a sidelink aperiodic gap. A processor may transmit a message indicating whether the first UE is allowed to request at least one of a periodic and an aperiodic a gap according to one or more of the indicated capabilities. A processor may further receive a sidelink information message comprising an absolute radio frequency channel number (ARFCN) and an associated gap list. A processor may also be configured to determine at least one gap that the first UE is authorized to utilize based on the sidelink information message. Additionally, a processor may be configured to transmit an RRC reconfiguration message having and updated gap list to the first UE.

In accordance with aspects of the disclosure, the foregoing systems, methods, and apparatuses may be implemented in combination with one or more additional features, such as the following features whether alone or in combination. For example, the above systems, methods, and apparatuses may be implemented where the receiving, transmitting and determining steps are implemented by a base station and the first UE is one of: a relay UE, and a remote UE communicating through a relay UE. The above systems, methods, and apparatuses may be implemented where the receiving, transmitting and determining steps are implemented by a relay user equipment (UE), and the first UE is a remote UE. In some instances, the sidelink configuration message may indicate a capability of the first UE to support an aperiodic gap. The above systems, methods, and apparatuses may further include receiving an MAC-CE message from the first UE to indicate that an aperiodic gap from the associated gap list is needed, and transmitting an MAC-CE confirmation message to the first UE indicating that the aperiodic gap from the associated cap list can be used. The above systems and methods may be implemented where an aperiodic gap of the associated gap list includes a duration and associated bitmap. Additionally, a message transmitted indicating whether the first UE is allowed to request a gap according to the aperiodic gap capability indication may be an RRC reconfiguration message. A message received indicating whether the first UE is allowed to request a gap according to the periodic gap capability indication may be one of an RRC reconfiguration message and SIB12 message. Further, the above systems, methods and apparatuses may be implemented where the sidelink configuration message indicating a capability of the first UE to support only a sidelink periodic gap is an indication that the first UE does not currently support a sidelink aperiodic gap.

Other aspects, features, and embodiments will become apparent to those of ordinary skill in the art, upon reviewing the following description of specific, exemplary embodiments in conjunction with the accompanying figures. While features may be discussed relative to certain aspects and figures below, all embodiments can include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
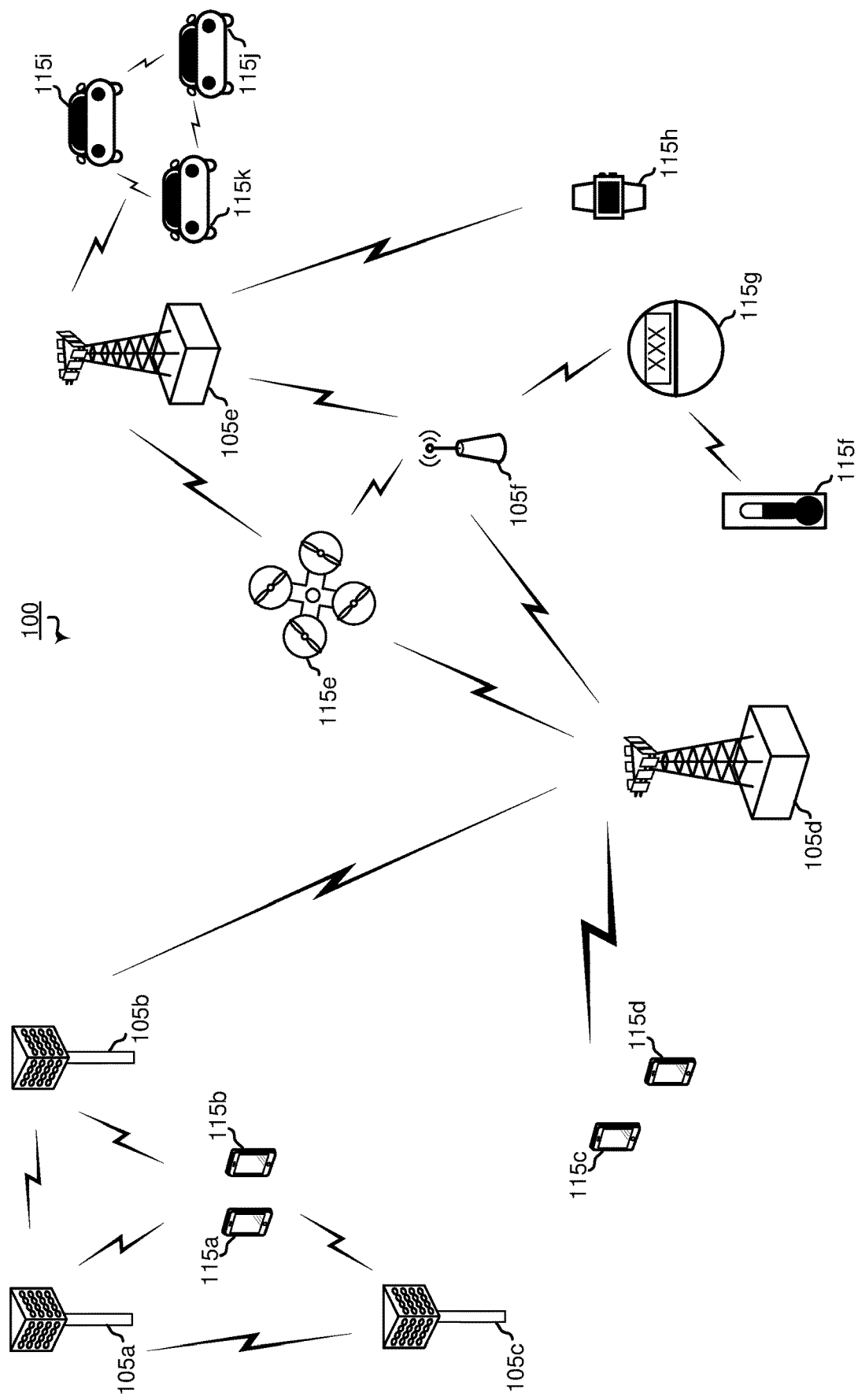
FIG. 1 is a block diagram illustrating details of a wireless communication system according to some embodiments of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects descried with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
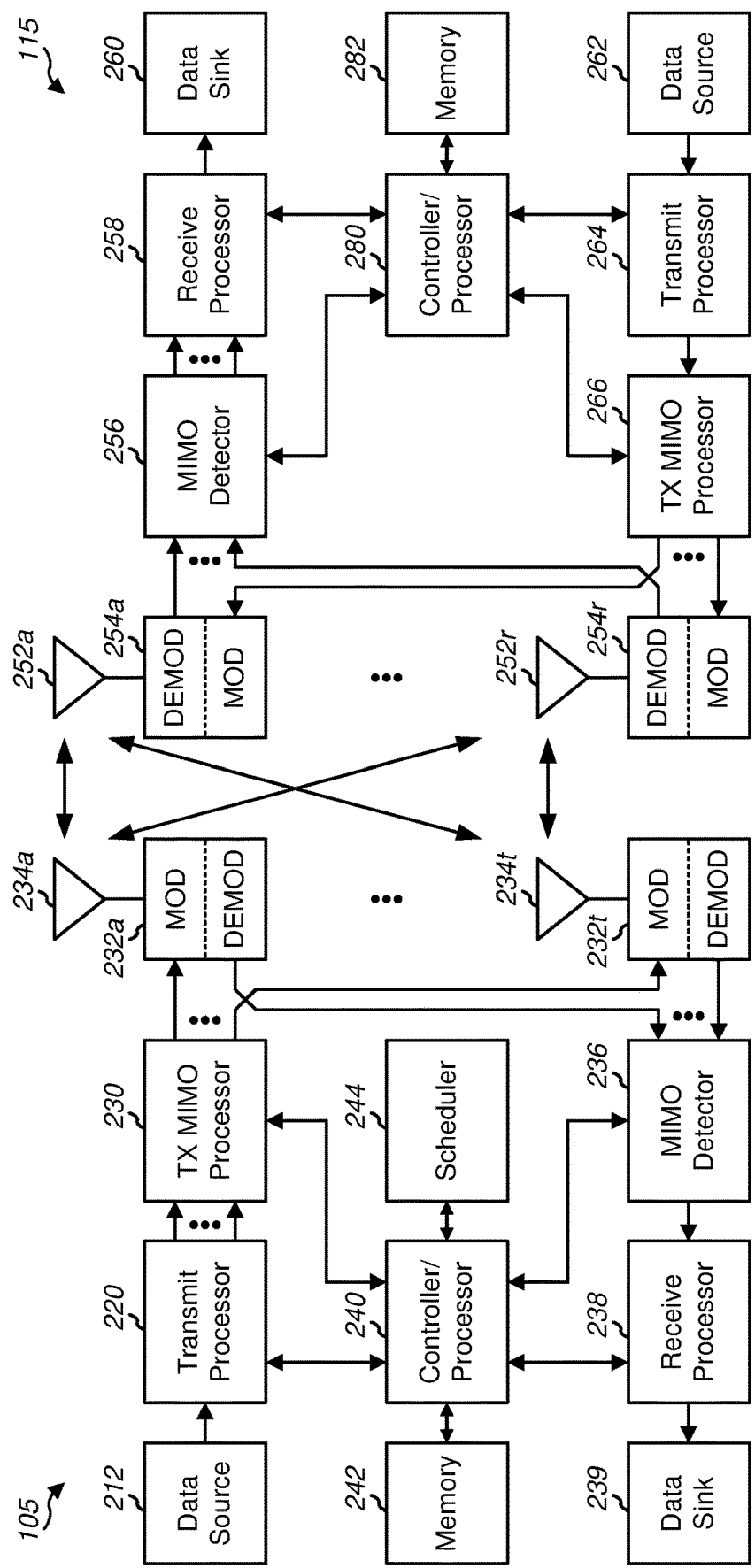
FIG. 2 is a block diagram conceptually illustrating a design of a base station and a UE configured according to some embodiments of the present disclosure.

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 3-9, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Wireless network 100 may be configured to establish and facilitate sidelink communications where a first UE 115 directly communicates with a second UE 115. Such communications allow multiple UEs to communicate without relaying all of the communication data via network 100. When implementing sidelink communications there may be multiple types of UEs. For example, a non-remote UE (or relay UE) 115d may be in communication with base station 105d and a remote UE 115c may be connected to relay UE 115d.

To facilitate sidelink communications, wireless network 100 may implement procedures to create and utilize sidelink gaps. Sidelink gaps allow for multiple advantages, for example, the UE is able to turn off UU transceivers and use a sidelink transceiver to perform discovery. Additionally, a sidelink gap allows the network to reduce transmissions to a UE during a gap and therefore reduces overhead on the system.

A sidelink gap is generally established when a UE 115 sends a sidelink gap request. Whether a UE is able to send a gap request can be configured via broadcast (e.g. LTE SIB19 signals) and/or dedicated signaling (e.g. RRCReconfiguration signals). After the UE obtains permission from the network to request a sidelink gap, the UE may send one or more gap patterns to a base station 105. The gap patterns are generally requested on a per frequency basis for transmission/reception. The gap pattern generally includes a period, offset, and a of bitmap configurable length N where each bit in the bitmap corresponds to a subframe on the serving cell. The UE takes into account all associated overheads (e.g. retuning and RAN4 overheads) and incorporates them into the bitmap.

It is appreciated that in current LTE implementations, only periodic gaps are requested and supported. After the UE sends the gap patterns, a base station determines which gap pattern may be utilized. A gap pattern is provided to the UE with no associated frequency. This is provided through an RRCReconfiguration message.

During a gap pattern in current LTE implementations, triggering a requested gap is left to the UE. The UE prioritizes the RACH procedure over sidelink gaps. Additionally, during the gap, the UE prioritizes discovery transmission over any UU/UL transmission only when a conflict with discovery transmissions occur. The UE also ensures that the sidelink gap does not impact RAN4 measurements.

Aspects of the present disclosure improve on previous sidelink gap procedures. For example, a relay UE and/or a remote UE 115 may be configured to request a periodic gap and/or an aperiodic gap. Further, a base station/gNB 105 may be configured to determine whether to establish and implement the same. It is appreciated that in previous LTE implementations, only periodic sidelink gaps were in-part due to how discovery messages were conveyed on a critical channel. For NR systems, different considerations apply. Therefore, aspects of the present disclosure provide for additional and improved methods for establishing sidelink gaps.

In some aspects, periodic sidelink gap patterns for NR systems may be implemented similar to previous methods, whereas aperiodic sidelink gap patterns may be configured in RRCReconfiguration messaging and may be activated/deactivated via MAC-CE messaging. One aperiodic gap pattern may include a duration and bitmap (one bit corresponding to one slot) during the duration. Whether the UE is allowed to send a gap request and gap type (periodic/aperiodic) may be configured via broadcast and/or dedicated signaling. A base station (e.g., gNB) may choose to accept/ignore/provide a modified gap pattern to the UE and provide the pattern to the UE in an RRCReconfiguration message with no associated frequency signaled.

In additional aspects, support for sidelink gap requests may be provided to different types of UEs. For example, aspects may allow for a non-remote UE (normal sidelink or relay) or a remote UE to support both aperiodic and periodic sidelink gaps. For the case of a non-remote UE, the UE can request and be configured with a TX and/or RX sidelink gap by the base station and may support both a periodic and an aperiodic sidelink gap. A remote UE working in a relay system may function in a level 2 or level 3 relay. In a level 3 relay, the remote UE will send packets to the relay UE where they are decoded and forwarded to the base station. In this case, the relay UE may be utilized to perform the gap configuration upon receiving a request from the remote UE. In such a circumstance, aspects provide for a remote UE that may support both a periodic and aperiodic sidelink gap. For a level 2 relay, gap configuration messaging may be implemented via the relay UE using RRC messaging in a manner that is transparent to the relay UE. Because of this, aspects described herein may only utilize periodic sidelink gaps on a level 2 relay configuration as the MAC-CE messaging used to establish an aperiodic gap sent via the relay UE may have unpredicted timing Accordingly, a UE 115 may have either no capability to support a sidelink gap, capability to support only a periodic sidelink gap, or the capability to support both an aperiodic and periodic sidelink gap. In some aspects, whether to enable or disable a gap requests may be configured in a NR SIB12 signal or in an RRCReconfiguration message. Upon reception by the wireless network of information indicating that UE 115 has sidelink capability to support an aperiodic gap, the network can reconfigure whether the UE can request an aperiodic gap or periodic gap in an RRCReconfiguration message.

Figure 3:
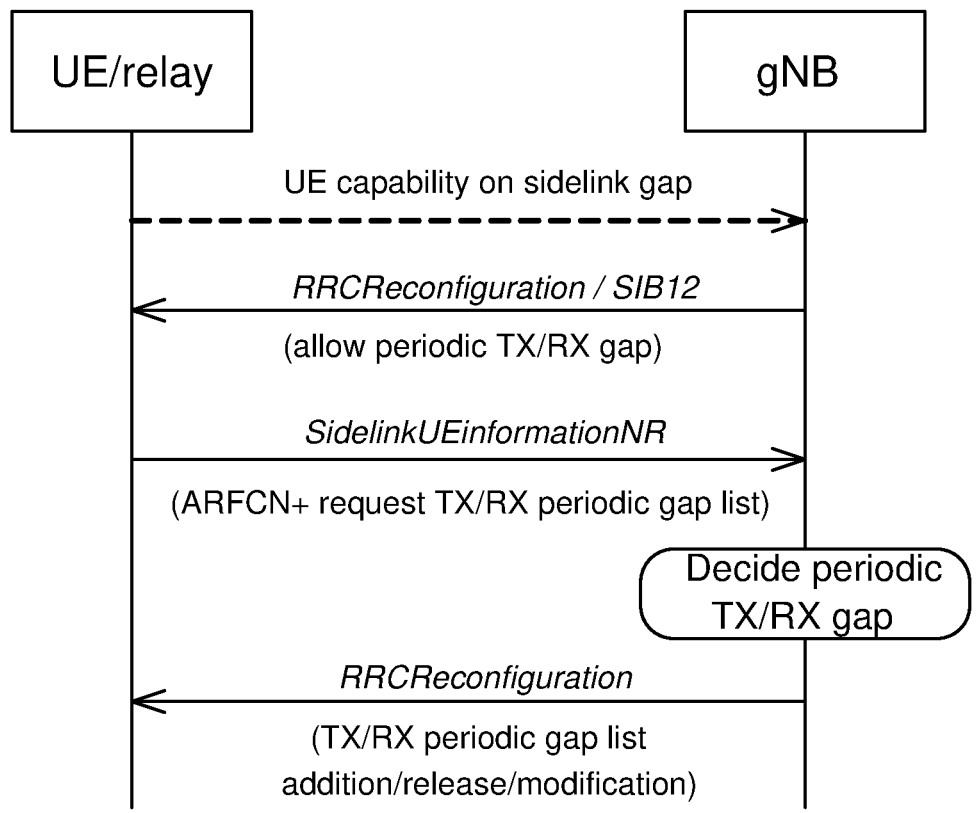
FIG. 3 is a signaling flow diagram illustrating a periodic gap configuration process between a first UE and a base station according to some embodiments of the present disclosure.

FIG. 3 is a signaling flow diagram illustrating a periodic gap configuration process between a first UE 115 (UE/relay) and a base station 105 (gNB) according to some embodiments of the present disclosure. Starting at the top arrow, UE 115 (acting as a relay UE in this example) transmits its capability regarding whether the UE can support a sidelink periodic gap to base station 105. Base station 105 then responds to UE 115 to indicate whether a periodic TX/RX gap is allowed. This response may be implemented in various methods, for example, via an RRCReconfiguration message or an SIB12 message.

UE 115 may then request to use/change/modify a TX/RX gap. Such a request may be conveyed using a SidelinkUEingormationNR message. This request may include information such as an absolute radio frequency channel number (ARFCN) and a TX/RX periodic gap list. A periodic gap pattern may include a periodicity, offset, duration and an associated bitmap (where one bit corresponds to one slot). Upon receiving the request, base station 105 determines the final gap pattern and sends an updated TX/RX periodic gap list to the UE via an RRCReconfiguration message. The gap will generally be per UE instead of being per frequency or ARFCN.

Figure 4:
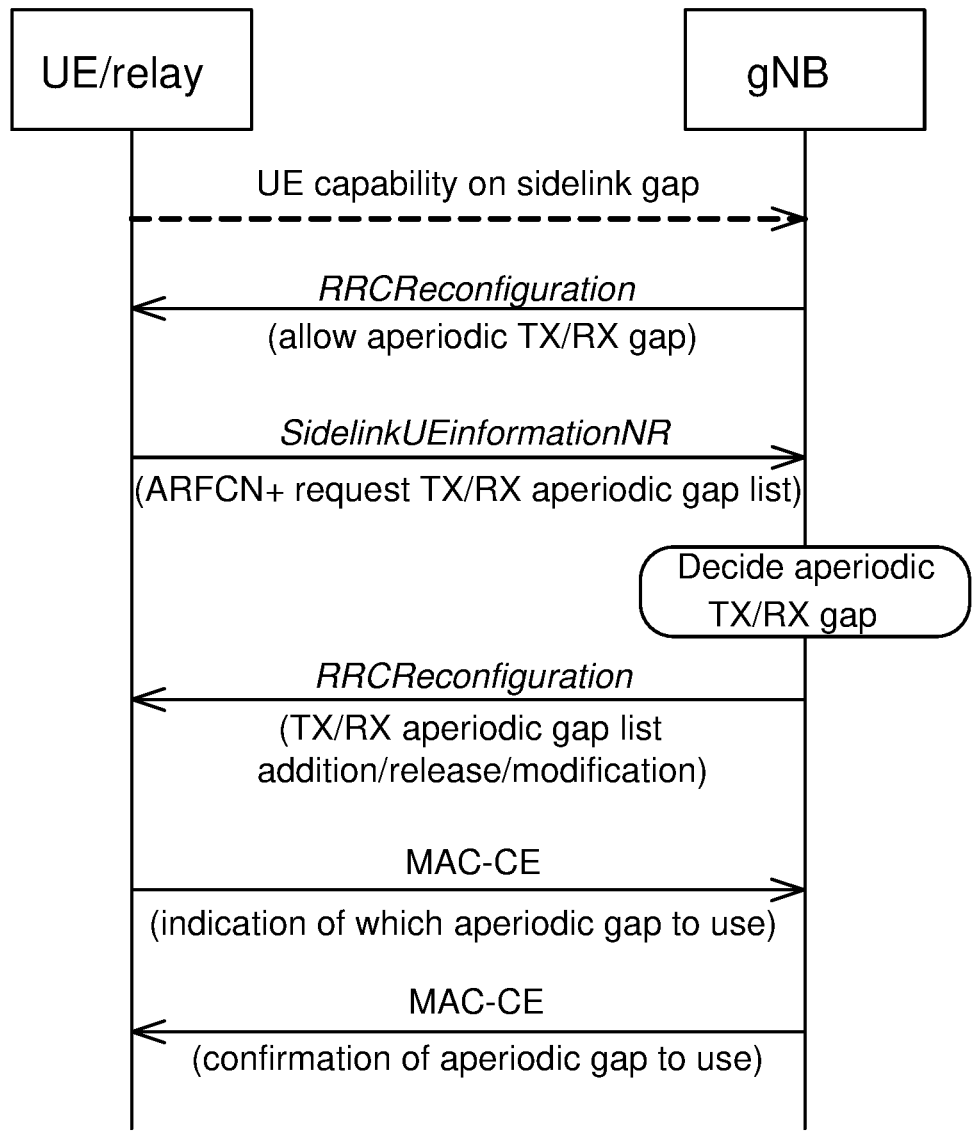
FIG. 4 is a signaling flow diagram illustrating an aperiodic gap configuration process between a first UE and a base station according to some embodiments of the present disclosure.

FIG. 4 is a signaling flow diagram illustrating an aperiodic gap configuration process between a first UE 115 (UE/relay) and a base station 105 (gNB) according to some embodiments of the present disclosure. Starting at the top arrow, UE 115 (acting as a relay UE in this example) transmits its capability regarding whether the UE can support a sidelink gap to base station 105. In this case, UE 115 indicates that it can support an aperiodic sidelink gap. Base station 105 then responds to UE 115 to indicate whether an aperiodic TX/RX gap is allowed. This response may be implemented via an RRCReconfiguration message. In this example, an RRCReconfiguration message is utilized to indicate whether an aperiodic gap is allowed because the aperiodic gap is UE specific.

UE 115 may then request to use/change/modify a TX/RX gap. Such a request may be conveyed using a SidelinkUEingormationNR message. This request may include information such as an absolute radio frequency channel number (ARFCN) and a TX/RX aperiodic gap list. An aperiodic gap pattern will generally include less information than a periodic gap pattern because certain information may not be needed, e.g., periodicity and offset information. An aperiodic gap pattern may include a duration and an associated bitmap (where one bit corresponds to one slot). Upon receiving the request, base station 105 determines the final aperiodic gap pattern and sends an updated TX/RX aperiodic gap list to UE 115 via an RRCReconfiguration message.

With the aperiodic sidelink gaps configured, UE 115 may then inform base station 105 that an aperiodic gap is needed via an MAC-CE message. Base station 105 will then respond with a confirmation message using an MAC-CE message. At this point, an aperiodic sidelink gap may be established and utilized by UE 115.

Figure 5:
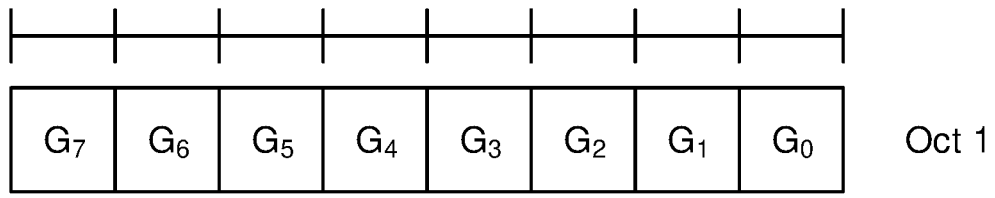
FIG. 5 illustrates a design of an MAC-CE data block for an aperiodic sidelink gap according to some embodiments of the present disclosure

FIG. 5 illustrates a design of an MAC-CE data block for an activation message transmitted from a UE requesting to utilize an aperiodic sidelink gap, and confirmation message from a gNB or relay UE confirming that the sidelink gap may be utilized according to some embodiments of the present disclosure. For the request data block, Gi is the i-th configured aperiodic sidelink gap pattern. Up to eight patterns may be configured in an RRC message with one bit to request activation. This data block is transmitted from the requesting UE to a relay UE or gNB. Similarly, for the confirmation data block, Gi is the i-th configured aperiodic sidelink gap pattern. Up to eight patterns may be configured in an RRC message with one bit to confirm activation. This data block is transmitted from the relay UE or gNB to the requesting UE.

Figure 6:
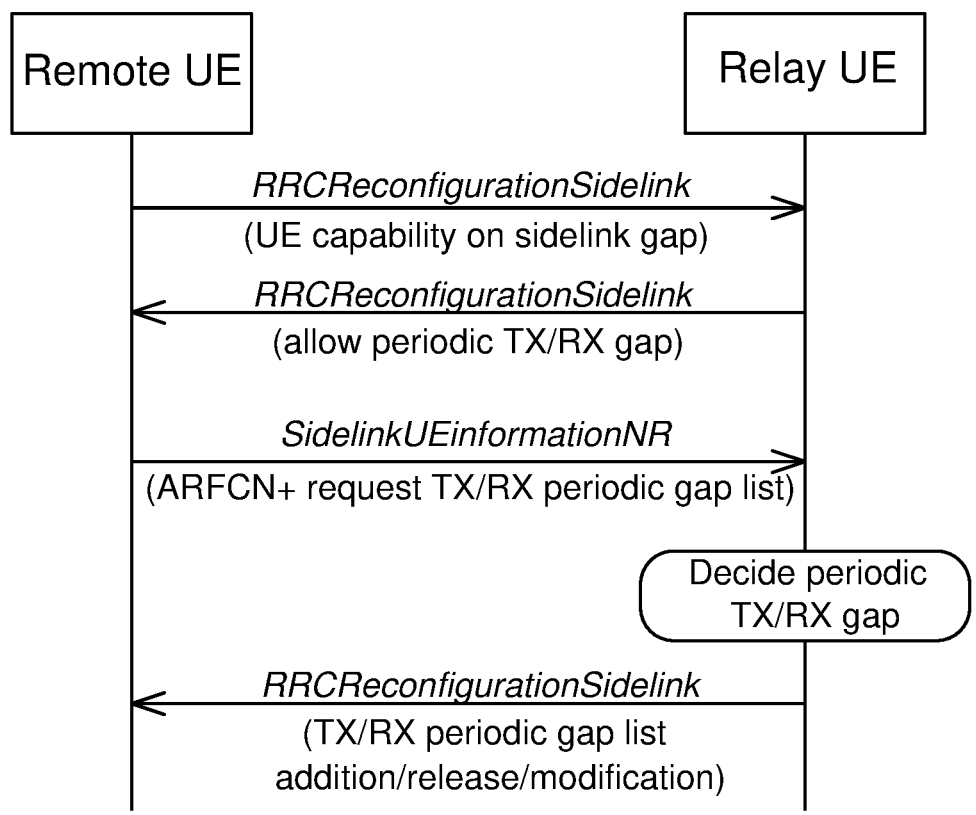
FIG. 6 is a signaling flow diagram illustrating a periodic gap configuration process between a remote UE and a relay UE according to some embodiments of the present disclosure.

FIG. 6 is a signaling flow diagram illustrating a periodic gap configuration process between a remote UE (e.g. UE 115*a*) and a relay UE 115 (e.g. UE 115*b*) acting in a level 3 relay configuration according to some embodiments of the present disclosure. It is appreciated that this process will function similar to the process for obtaining a periodic sidelink gap described above between a UE and a base station. Starting at the top arrow, UE 115*a* (acting as a remote UE in this example) transmits its capability regarding whether the UE can support a sidelink periodic gap to relay UE 115*b*. Relay UE 115*b* then responds to remote UE 115*a* to indicate whether a periodic TX/RX gap is allowed. This response may be implemented in various methods, for example, via an RRCReconfiguration message (RRCReconfigurationSidelink) as the UEs are currently connected in a relay mode.

UE 115*a* may then request to use/change/modify a TX/RX gap. Such a request may be conveyed using a SidelinkUEinformationNR message. This request may include information such as an absolute radio frequency channel number (ARFCN) and a TX/RX periodic gap list. A periodic gap pattern may include a periodicity, offset, duration and an associated bitmap (where one bit corresponds to one slot). Upon receiving the request, relay UE 115*b* makes the determination of the final gap pattern and sends an updated TX/RX periodic gap list to UE 115*a* via an RRCReconfiguration message (RRCReconfigurationSidelink). The gap will generally be per UE instead of being per frequency or ARFCN.

Figure 7:
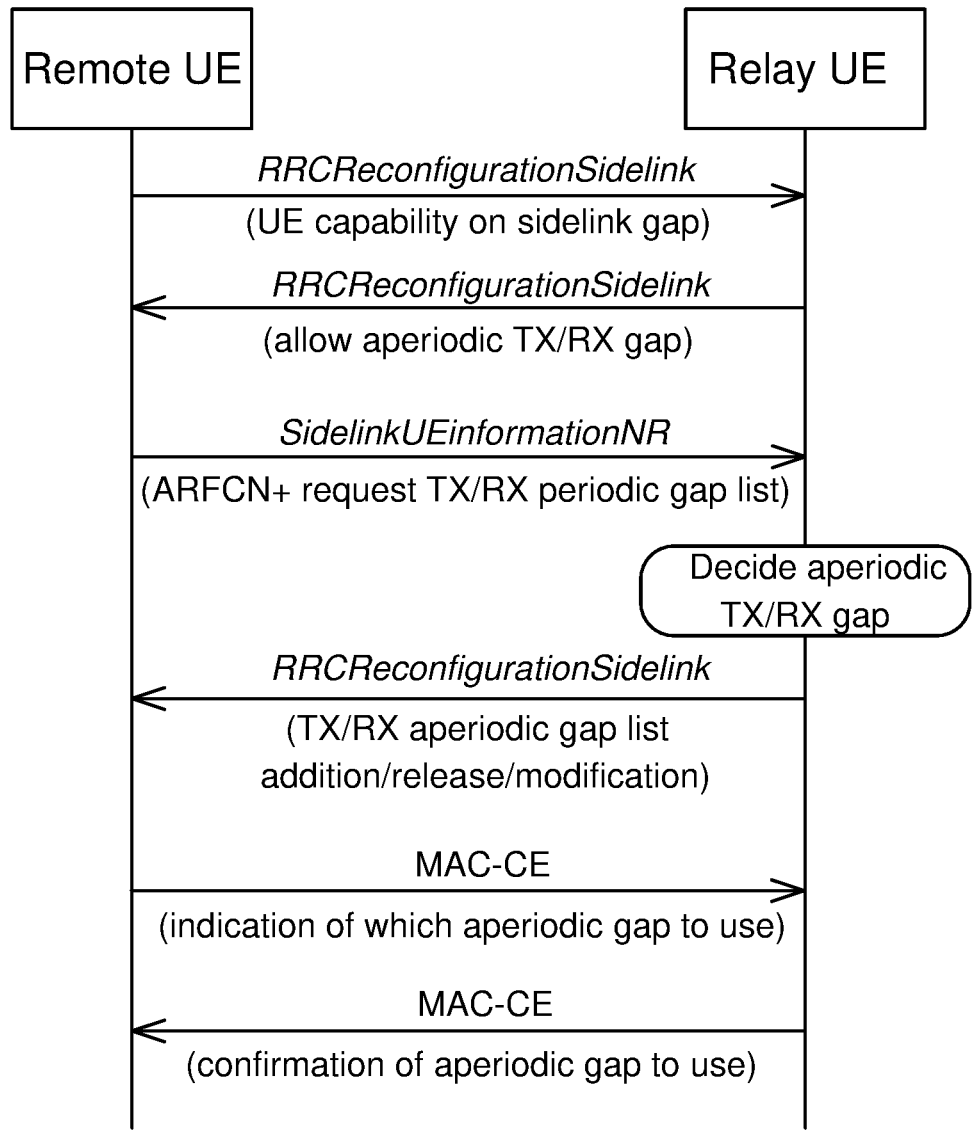
FIG. 7 is a signaling flow diagram illustrating an aperiodic gap configuration process between a remote UE and a relay according to some embodiments of the present disclosure.

FIG. 7 is a signaling flow diagram illustrating an aperiodic gap configuration process between a remote UE (e.g. UE 115*a*) and a relay UE 115 (e.g. UE 115*b*) acting in a level 3 relay configuration according to some embodiments of the present disclosure. It is appreciated that this process will function similar to the process for obtaining an aperiodic sidelink gap described above between a UE and a base station. Starting at the top arrow, UE 115*a* (acting as a remote UE in this example) transmits its capability regarding whether the UE can support a sidelink gap to UE 115*b* (acting as a relay UE). In this case, UE 115*a* indicates that it can support an aperiodic sidelink gap. UE 115*b* then responds to UE 115*a* to indicate whether an aperiodic TX/RX gap is allowed. This response may be implemented via an RRCReconfiguration message (RRCReconfigurationSidelink).

UE 115*a* may then request to use/change/modify a TX/RX gap. Such a request may be conveyed using a SidelinkUEingormationNR message. This request may include information such as an absolute radio frequency channel number (ARFCN) and a TX/RX aperiodic gap list. An aperiodic gap pattern will generally include less information than a periodic gap pattern because certain information may not be needed, e.g., periodicity and offset information. An aperiodic gap pattern may include a duration and an associated bitmap (where one bit corresponds to one slot). Upon receiving the request, UE 115*b* determines the final aperiodic gap pattern and sends an updated TX/RX aperiodic gap list to UE 115a via an RRCReconfiguration message (RRCReconfigurationSidelink).

With the aperiodic sidelink gaps configured, UE 115a may then inform UE 115b that an aperiodic gap is needed via an MAC-CE message. UE 115b will then respond with a confirmation message using an MAC-CE message. In some aspects, because this embodiment is implemented between a remote UE 115a and relay UE 115b, the MAC-CE messaging may be implemented in a similar format, but over a different logical channel ID than the Uu MAC-CE. This will allow remote UE 115a to differentiate whether the message is a PC5 MAC-CE or a Uu MAC-CE. At this point, an aperiodic sidelink gap may be established and utilized by UE 115a.

Figure 8:
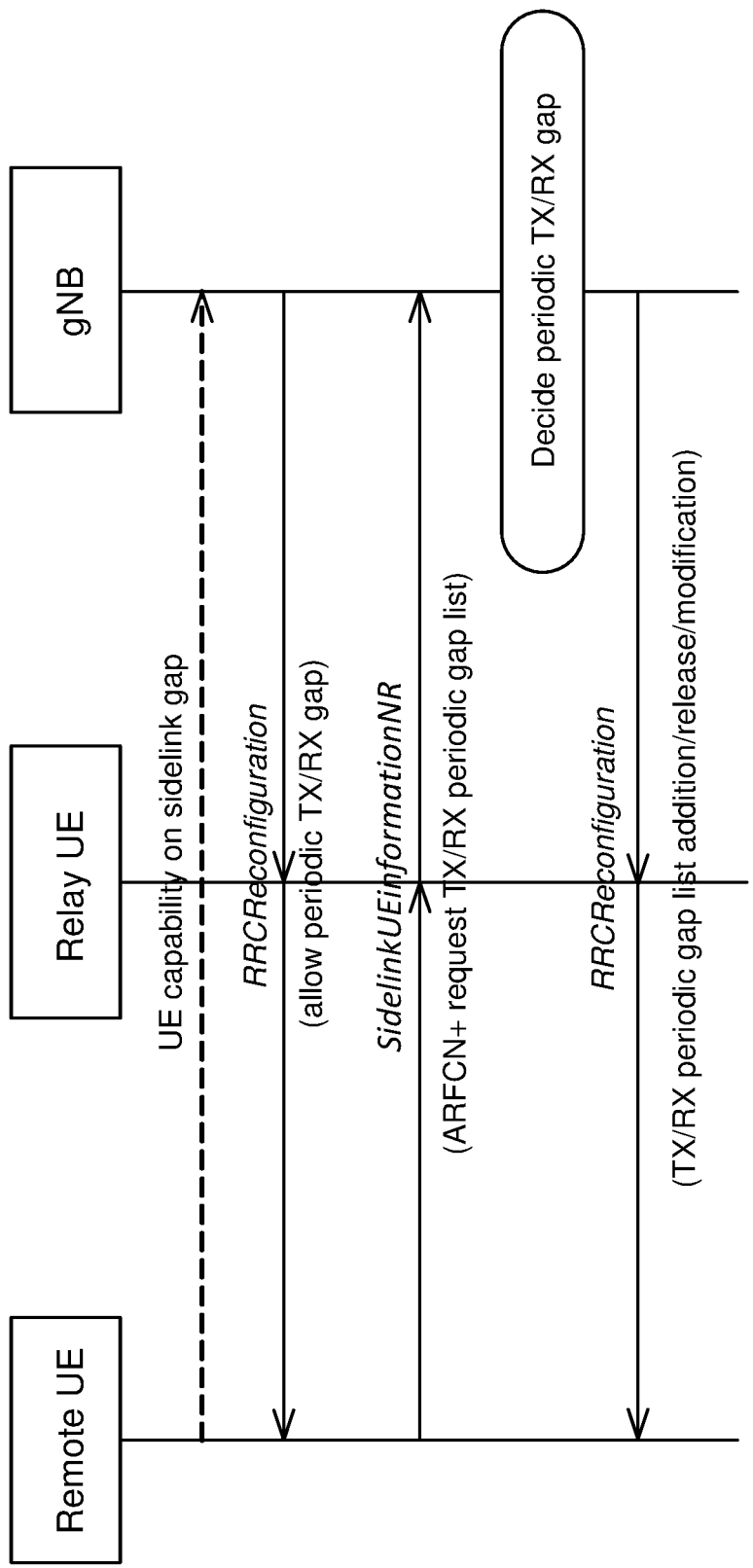
FIG. 8 is a signaling flow diagram illustrating a periodic gap configuration process between a remote UE and a base station according to some embodiments of the present disclosure.

FIG. 8 is a signaling flow diagram illustrating a periodic gap configuration process between UE 115 and base station 105 according to some embodiments of the present disclosure. In this embodiment, UE 115 may be a remote UE (e.g. 115a) communicating to base station 105 (gNB) via relay UE (e.g. 115b). It is appreciated that this process will function similar to the process for obtaining a periodic sidelink gap described above between a UE and a base station shown in FIG. 3 however, messages may be forwarded to base station 105 and remote UE 115a via relay UE 115b. Specifically, starting at the top arrow, UE 115a transmits its capability regarding whether the UE can support a sidelink periodic gap to base station 105. Base station 105 then responds to UE 115a to indicate whether a periodic TX/RX gap is allowed. This response may be implemented in various methods, for example, via an RRCReconfiguration message.

UE 115a may then request to use/change/modify a TX/RX gap. Such a request may be conveyed using a SidelinkUEingormationNR message. This request may include information such as an absolute radio frequency channel number (ARFCN) and a TX/RX periodic gap list. A periodic gap pattern may include a periodicity, offset, duration and an associated bitmap (where one bit corresponds to one slot). Upon receiving the request, base station 105 determines the final gap pattern and sends an updated TX/RX periodic gap list to the UE via an RRCReconfiguration message. The gap will generally be per UE instead of being per frequency or ARFCN.

In accordance with the aspects described above, additional benefits may be gained by allowing for both periodic and aperiodic sidelink gaps. For example, during a gap, the radio resource management (RRM) and radio link management (RLM) towards a gNB is relaxed because its bandwidth is shared between RRM/RLM for gNB and sidelink discovery. This allows for a smaller number of measurement resources and/or less frequent measurements due to larger minimum periodicity.

Figures 9, 10:
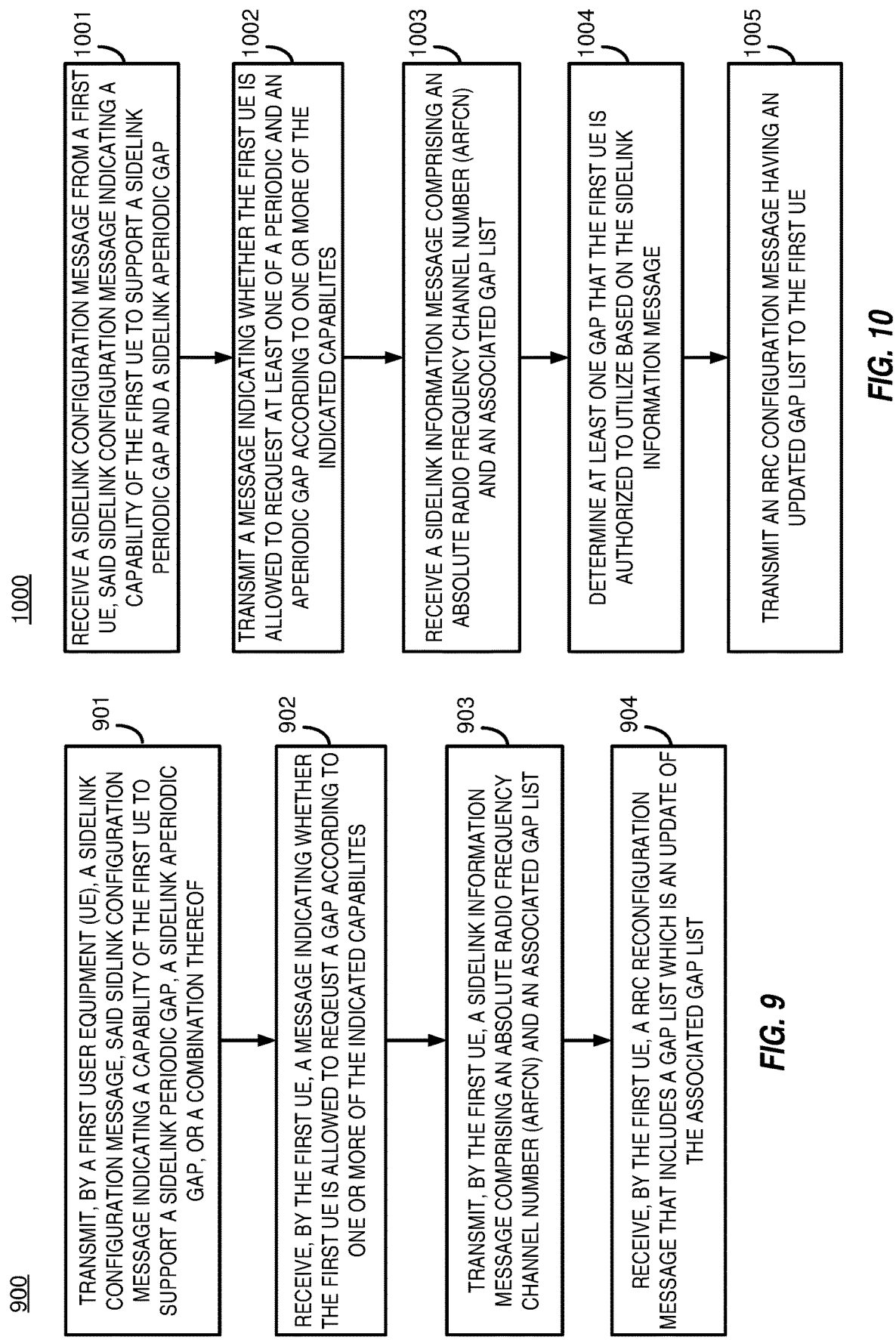
FIGS. 9 and 10 show flow diagrams of operation by devices in a wireless network facilitating the implementation of sidelink gaps according to some embodiments of the present disclosure.

FIG. 9 shows a flow diagram 900 of operation by devices in a wireless network facilitating the implementation of sidelink gaps according to some embodiments of the present disclosure. At block 901 of example flow 900, a first UE may transmit a sidelink configuration message, said sidelink configuration message indicating a capability of the first UE to support a sidelink periodic gap, a sidelink aperiodic gap, or a combination thereof. At block 902 of example flow 900, the first UE may receive a message indicating whether the first UE is allowed to request a gap according to one or more of the indicated capabilities. At block 903 of example flow 900, the first UE may treansmit a sidelink information message comprising an absolute radio frequency channel number (ARFCN) and an associated gap list. Further, at block 904 of example flow 900, the first UE may receive an RRC reconfiguration message that includes a gap list which is an update of the associated gap list.

FIG. 10 shows a flow diagram 1000 of operation by devices in a wireless network facilitating the implementation of sidelink gaps according to some embodiments of the present disclosure. At block 1001 of example flow 1000, a sidelink configuration message is received from a first UE, said sidelink configuration message indicating a capability of the first UE to support a sidelink periodic gap and a sidelink aperiodic gap. At block 1002 of example flow 1000, a message indicating whether the first UE is allowed to request at least one of a periodic and an aperiodic a gap is transmitted according to one or more of the indicated capabilities. Additionally, at block 1003 of example flow 1000, a sidelink information message is received which comprising an absolute radio frequency channel number (ARFCN) and an associated gap list. Further, at block 1004 of example flow 1000, at least one gap that the first UE is authorized to utilize is determined based on the sidelink information message. At block 1005 of example flow 1006, an RRC reconfiguration message is transmitted having and updated gap list to the first UE.

As described above, aspects of these flow diagrams may implement such techniques between a relay UE and BS, remote UE and BS, remote UE and relay UE, and the like. Further, in the event that a aperiodic gap is indicated, the method may include one or more of transmitting, by the first UE, an MAC-CE message to indicate that an aperiodic gap from the associated gap list is needed, and receiving, by the first UE, an MAC-CE confirmation message indicating that the aperiodic gap from the associated cap list can be used. Moreover, messaging may be implemented using one or more sideling messages, RRC configuration messages, SIB12 messages, and the like.

Figure 11:
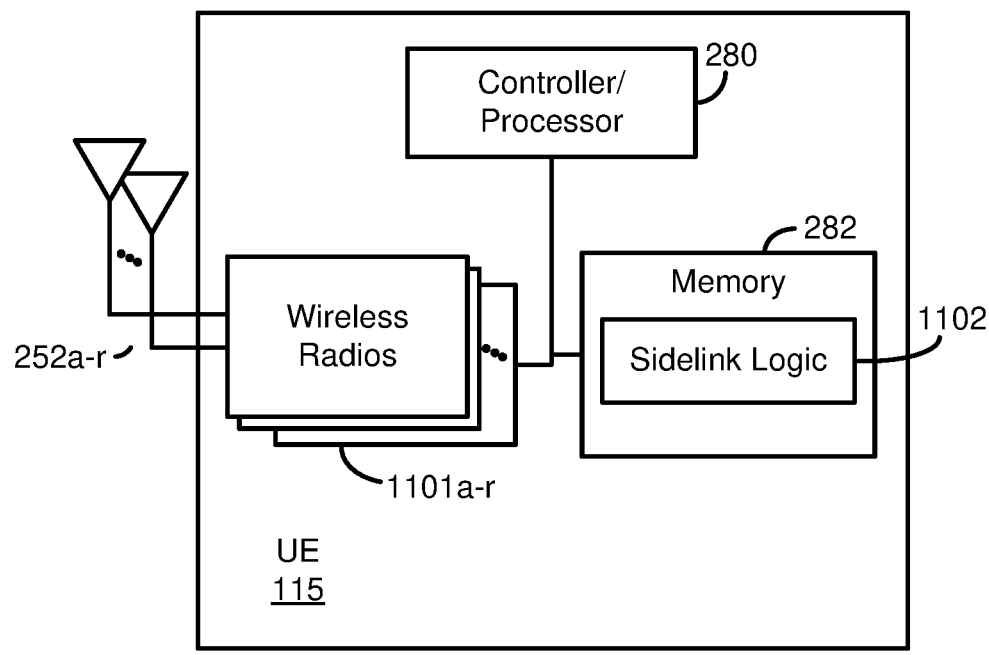
FIG. 11 is a block diagram conceptually illustrating a design of a UE configured to implement sidelink gaps according to some embodiments of the present disclosure.

FIG. 11 is a block diagram conceptually illustrating a design of a UE configured to implement sidelink gaps according to some embodiments of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1100a-r and antennas 252a-r. Wireless radios 1500a-r includes various components and hardware, as illustrated in FIG. 2 for UE 115, including modulator/demodulators 254a-r, MIMO detector 256, receive processor 258, transmit processor 264, and TX MIMO processor 266. UE 115 may act as a remote UE or a relay UE according to various aspects.

UE 115 further includes sidelink logic 1102 stored in memory 282. Sidelink logic may include logic to perform the requisite messaging to establish a periodic and/or aperiodic sidelink gap as described above with respect to FIGS. 3-9. For example, UE 115 may act as the UE requesting a sidelink gap or may act as a relay UE which establishes a sidelink gap for a remote UE. In doing so, sidelink logic 1102 in conjunction with controller/processor 280 and wireless radios 1100a-r, may implement the respective messaging and actions/determinations to establish a sidelink gap.

Figure 12:
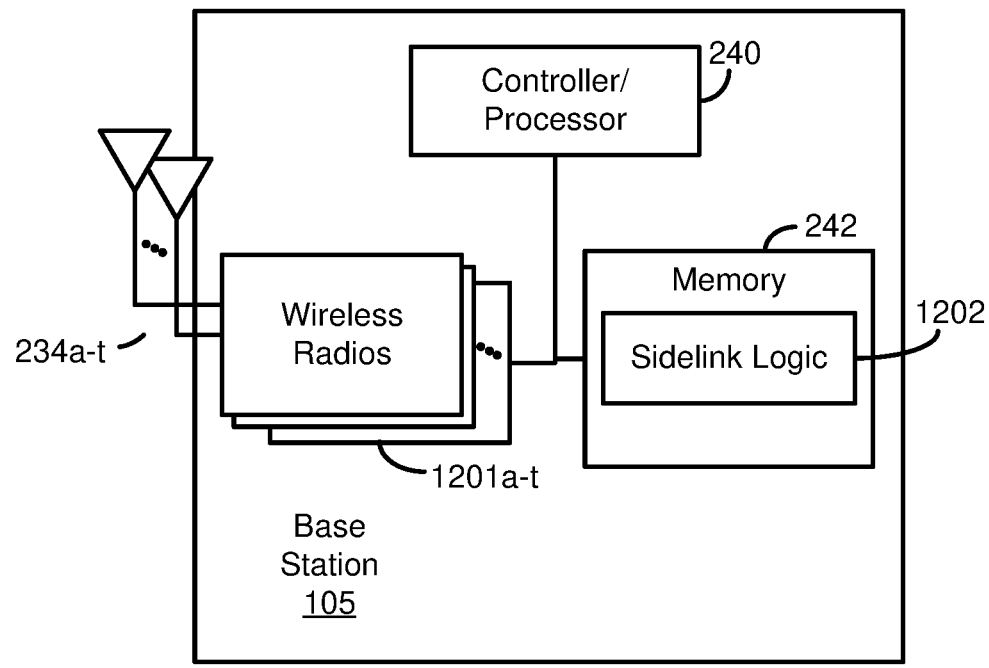
FIG. 12 is a block diagram conceptually illustrating a design of a base station configured to implement sidelink gaps according to some embodiments of the present disclosure.

FIG. 12 is a block diagram conceptually illustrating a design of a base station configured to implement sidelink gaps according to some embodiments of the present disclosure. gNB 105 includes the structure, hardware, and components as illustrated for eNB 105 of FIG. 2 (the template figure showing the components of the UE and base station). For example, gNB 105 includes controller/processor 240, which operates to execute logic or computer instructions stored in memory 242, as well as controlling the components of eNB 105 that provide the features and functionality of gNB 105. gNB 105, under control of controller/processor 240, transmits and receives signals via wireless radios 1200*a-t* and antennas 234*a-t*. Wireless radios 1200*a-t* includes various components and hardware, as illustrated in FIG. 2 for gNB 105, including modulator/demodulators 232*a-t*, MIMO detector 236, receive processor 238, transmit processor 220, and TX MIMO processor 230.

gNB 105 further includes sidelink logic 1202 stored in memory 242. Sidelink logic may include logic to perform the requisite messaging to establish a periodic and/or aperiodic sidelink gap as described above with respect to FIGS. 3-9. gNB may be in communication with a remote UE via a relay UE, and/or may implement sidelink gaps with a non-remote UE. In doing so, sidelink logic 1202 in conjunction with controller/processor 240 and wireless radios 1200*a-r*, may implement the respective messaging and actions/determinations to establish a sidelink gap.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and modules described herein (e.g., the components, functional blocks, and modules in FIG. 2) may comprise processors, electronics devices, hardware devices, electronics components, logical circuits, memories, software codes, firmware codes, etc., or any combination thereof. In addition, features discussed herein relating to sidelink gaps may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 8-9) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   transmitting, by a first user equipment (UE), a sidelink configuration message, said sidelink configuration message indicating one or more capabilities of the first UE to support a sidelink periodic gap, a sidelink aperiodic gap, or a combination thereof;
   receiving, by the first UE, a message indicating whether the first UE is allowed to request a gap according to one or more of the indicated capabilities;
   transmitting, by the first UE, a sidelink information message comprising an absolute radio frequency channel number (ARFCN) and an associated gap list; and
   receiving, by the first UE, an RRC reconfiguration message that includes a gap list which is an update of the associated gap list based on the sidelink information message.

2. The method of claim 1, wherein the first UE is a relay UE and the messages transmitted and received by the first UE are between the first UE and a base station.

3. The method of claim 1, wherein the sidelink configuration message indicates a capability of the first UE to support an aperiodic gap.

4. The method of claim 3 further comprising: transmitting, by the first UE, an MAC-CE message to indicate that an aperiodic gap from the associated gap list is needed.

5. The method of claim 4 further comprising: receiving, by the first UE, an MAC-CE confirmation message indicating that the aperiodic gap from the associated gap list is used.

6. The method of claim 4, wherein the aperiodic gap of the associated gap list includes a duration and associated bitmap.

7. The method of claim 4, wherein message received indicating whether the first UE is allowed to request a gap according to the aperiodic gap capability indication is an RRC reconfiguration message.

8. An apparatus configured for wireless communication, the apparatus comprising:
   at least one processor; and
   a memory coupled to the at least one processor,
   wherein the at least one processor is configured to:
   transmit, by a first user equipment (UE), a sidelink configuration message, said sidelink configuration message indicating one or more capabilities of the first UE to support a sidelink periodic gap, a sidelink aperiodic gap, or a combination thereof;
   receive, by the first UE, a message indicating whether the first UE is allowed to request a gap according to one or more of the indicated capabilities;
   transmit, by the first UE, a sidelink information message comprising an absolute radio frequency channel number (ARFCN) and an associated gap list; and
   receive, by the first UE, an RRC reconfiguration message includes a gap list which is an update of the associated gap list based on the sidelink information message.

9. The apparatus of claim 8, wherein the first UE is a relay UE and the messages transmitted and received by the first UE are between the first UE and a base station.

10. The apparatus of claim 9, wherein the first UE is a remote UE and the messages transmitted and received by the first UE are between the first UE and a relay UE.

11. The apparatus of claim 9, wherein the first UE is a remote UE and the messages transmitted and received by the first UE are between the first UE and a base station.

12. The apparatus of claim 11, wherein the sidelink configuration message indicates a capability of the first UE to support an aperiodic gap.

13. The apparatus of claim 12, wherein the at least one processor is further configured to: transmit an MAC-CE message to indicate that an aperiodic gap from the associated gap list is needed.

14. The apparatus of claim 13, wherein the at least one processor is further configured to: receive, by the first UE, an MAC-CE confirmation message indicating that the aperiodic gap from the associated gap list is used.

15. The apparatus of claim 13, wherein the aperiodic gap of the associated gap list includes a duration and associated bitmap.

16. The apparatus of claim 13, wherein message received indicating whether the first UE is allowed to request a gap according to the aperiodic gap capability indication is an RRC reconfiguration message.

17. The apparatus of claim 8, wherein the sidelink configuration message indicating a capability of the first UE to support only a sidelink periodic gap is an indication that the first UE does not currently support a sidelink aperiodic gap.

18. A method of wireless communication, comprising:
   receiving a sidelink configuration message from a first UE, said sidelink configuration message indicating one or more capabilities of the first UE to support a sidelink periodic gap and a sidelink aperiodic gap;
   transmitting a message indicating whether the first UE is allowed to request at least one of a periodic gap and an aperiodic gap according to one or more of the indicated capabilities;
   receiving a sidelink information message comprising an absolute radio frequency channel number (ARFCN) and an associated gap list;
   determining at least one gap that the first UE is authorized to utilize based on the sidelink information message; and
   transmitting an RRC reconfiguration message having an update of the associated gap list to the first UE.

19. The method of claim 18, wherein the receiving, transmitting and determining steps are implemented by a base station and the first UE is one of: a relay UE, and a remote UE communicating through a relay UE.

20. The method of claim 18, wherein the receiving, transmitting and determining steps are implemented by a relay user equipment (UE), and the first UE is a remote UE.

21. The method of claim 18, wherein the sidelink configuration message indicates a capability of the first UE to support an aperiodic gap.

22. The method of claim 21 further comprising: receiving an MAC-CE message from the first UE to indicate that an aperiodic gap from the associated gap list is needed.

23. The method of claim 21 further comprising: transmitting an MAC-CE confirmation message to the first UE indicating that the aperiodic gap from the associated gap list is used.

24. The method of claim 18, wherein the sidelink configuration message indicating a capability of the first UE to support only a sidelink periodic gap is an indication that the first UE does not currently support a sidelink aperiodic gap.

25. The method of claim 24, wherein message received indicating whether the first UE is allowed to request a gap according to the periodic gap capability indication is one of an RRC reconfiguration message and SIB12 message.

26. A non-transitory computer-readable medium having program code recorded thereon, the program code comprising:
program code executable by a computer for causing the computer to:
receive a sidelink configuration message from a first UE, said sidelink configuration message indicating one or more capabilities of the first UE to support a sidelink periodic gap and a sidelink aperiodic gap;
transmit a message indicating whether the first UE is allowed to request at least one of a periodic gap and an aperiodic gap according to one or more of the indicated capabilities;
receive a sidelink information message comprising an absolute radio frequency channel number (ARFCN) and an associated gap list;
determine at least one gap that the first UE is authorized to utilize based on the sidelink information message; and
transmit an RRC reconfiguration message having an update of the associated gap list to the first UE.

27. The non-transitory computer-readable medium of claim 26, wherein the receiving, transmitting and determining steps are implemented by a base station and the first UE is one of: a relay UE, and a remote UE communicating through a relay UE.

28. The non-transitory computer-readable medium of claim 26, wherein the receiving, transmitting and determining steps are implemented by a relay user equipment (UE), and the first UE is a remote UE.

29. The non-transitory computer-readable medium of claim 26, wherein the sidelink configuration message indicates a capability of the first UE to support an aperiodic gap.

30. An apparatus configured for wireless communication, the apparatus comprising:
at least one processor; and
a memory coupled to the at least one processor,
wherein the at least one processor is configured to:
receive a sidelink configuration message from a first UE, said sidelink configuration message indicating one or more capabilities of the first UE to support a sidelink periodic gap and a sidelink aperiodic gap;
transmit a message indicating whether the first UE is allowed to request at least one of a periodic gap and an aperiodic gap according to one or more of the indicated capabilities;
receive a sidelink information message comprising an absolute radio frequency channel number (ARFCN) and an associated gap list;
determine at least one gap that the first UE is authorized to utilize based on the sidelink information message; and
transmit an RRC reconfiguration message having an update of the associated gap list to the first UE.

31. The apparatus of claim 30, wherein the receiving, transmitting and determining steps are implemented by a base station and the first UE is one of: a relay UE, and a remote UE communicating through a relay UE.

32. The apparatus of claim 30, wherein the receiving, transmitting and determining steps are implemented by a relay user equipment (UE), and the first UE is a remote UE.

33. The apparatus of claim 30, wherein the sidelink configuration message indicates a capability of the first UE to support an aperiodic gap.

34. The apparatus of claim 33, wherein the at least one processor is further configured to: receive an MAC-CE message from the first UE to indicate that an aperiodic gap from the associated gap list is needed.

35. The apparatus of claim 33, wherein message transmitted indicating whether the first UE is allowed to request a gap according to the aperiodic gap capability indication is an RRC reconfiguration message.

* * * * *